(12) United States Patent
Nishihara et al.

(10) Patent No.: US 8,180,114 B2
(45) Date of Patent: May 15, 2012

(54) GESTURE RECOGNITION INTERFACE SYSTEM WITH VERTICAL DISPLAY (75) Inventors: H. Keith Nishihara, Los Altos, CA (US); Shi-Ping Hsu, Pasadena, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1014 days.

(21) Appl. No.: 12/133,836

(22) Filed: Jun. 5, 2008

(65) Prior Publication Data

US 2008/0244468 A1 Oct. 2, 2008

Related U.S. Application Data (63) Continuation-in-part of application No. 11/485,788, filed on Jul. 13, 2006.

(51) Int. Cl.
*G06K 9/00* (2006.01)
(52) U.S. Cl. .......................... 382/114; 382/103; 382/107
(58) Field of Classification Search .................. 382/112, 382/113, 114, 288, 103, 106, 228; 345/863, 345/158, 156, 358; 715/863
See application file for complete search history.

(56) References Cited

U.S. PATENT DOCUMENTS

| | | | |
|---|---|---|---|
| 4,468,694 A * | 8/1984 | Edgar | ........................... 348/135 |
| 4,843,568 A | 6/1989 | Krueger et al. | |
| 4,924,506 A | 5/1990 | Crossley et al. | |
| 5,220,441 A | 6/1993 | Gerstenberger | |
| 5,239,373 A | 8/1993 | Tang et al. | |
| 5,475,422 A | 12/1995 | Mori et al. | |
| 5,483,261 A | 1/1996 | Yasutake | |
| 5,563,988 A | 10/1996 | Maes et al. | |
| 5,913,727 A | 6/1999 | Ahdoot | |
| 5,999,185 A | 12/1999 | Kato et al. | |
| 6,002,808 A | 12/1999 | Freeman | |
| 6,128,003 A | 10/2000 | Smith et al. | |

(Continued)

FOREIGN PATENT DOCUMENTS

DE 197 39 285 C1 11/1998

(Continued)

OTHER PUBLICATIONS

Vámossy, et al.: "*Virtual Hand—Hand Gesture Recognition System*"; SISY 2007, 5th International Symposium on Intelligent Systems and Informatics, Aug. 24-25, 2007, Subolica, Serbia, IEEE, p. 97-102.

(Continued)

*Primary Examiner* — Vikkram Bali
*Assistant Examiner* — Nancy Bitar
(74) *Attorney, Agent, or Firm* — Tarolli, Sundheim, Covell & Tummino LLP (57) ABSTRACT

One embodiment of the invention includes a gesture recognition interface system. The system may comprise a substantially vertical surface configured to define a gesture recognition environment based on physical space in a foreground of the substantially vertical surface. The system may also comprise at least one light source positioned to provide illumination of the gesture recognition environment. The system also comprises at least two cameras configured to generate a plurality of image sets based on the illumination being reflected from an input object in the gesture recognition environment. The system further comprises a controller configured to determine a given input gesture based on changes in relative locations of the input object in each of the plurality of image sets. The controller may further be configured to initiate a device input associated with the given input gesture.

15 Claims, 6 Drawing Sheets

U.S. PATENT DOCUMENTS

| | | | |
|---|---|---|---|
| 6,147,678 A * | 11/2000 | Kumar et al. ............... 345/158 |
| 6,195,104 B1 | 2/2001 | Lyons |
| 6,204,852 B1 | 3/2001 | Kumar et al. |
| 6,222,465 B1 | 4/2001 | Kumar et al. |
| 6,327,381 B1 | 12/2001 | Rogina et al. |
| 6,353,428 B1 | 3/2002 | Maggioni et al. |
| 6,359,612 B1 | 3/2002 | Peter et al. |
| 6,434,255 B1 | 8/2002 | Harakawa |
| 6,512,507 B1 | 1/2003 | Furihata et al. |
| 6,624,833 B1 | 9/2003 | Kumar et al. |
| 6,681,031 B2 | 1/2004 | Cohen et al. |
| 6,695,770 B1 | 2/2004 | Choy et al. |
| 6,714,901 B1 | 3/2004 | Cotin et al. |
| 6,720,949 B1 | 4/2004 | Pryor et al. |
| 6,788,809 B1 | 9/2004 | Grzeszczuk et al. |
| 6,796,656 B1 | 9/2004 | Dadourian |
| 6,806,849 B2 | 10/2004 | Sullivan |
| 6,857,746 B2 | 2/2005 | Dyner |
| 6,950,534 B2 | 9/2005 | Cohen et al. |
| 6,956,573 B1 | 10/2005 | Bergen et al. |
| 6,983,065 B1 | 1/2006 | Akgul et al. |
| 7,042,440 B2 | 5/2006 | Pryor et al. |
| 7,129,927 B2 | 10/2006 | Mattsson |
| 7,259,747 B2 | 8/2007 | Bell |
| 7,701,439 B2 | 4/2010 | Hillis et al. |
| 2001/0006426 A1 | 7/2001 | Son et al. |
| 2001/0043719 A1 | 11/2001 | Harakawa et al. |
| 2002/0090146 A1 | 7/2002 | Heger et al. |
| 2002/0093666 A1 * | 7/2002 | Foote et al. ............... 356/621 |
| 2002/0122113 A1 | 9/2002 | Foote |
| 2002/0126161 A1 * | 9/2002 | Kuzunuki et al. ............. 345/863 |
| 2002/0186221 A1 | 12/2002 | Bell |
| 2003/0058341 A1 | 3/2003 | Brodsky et al. |
| 2003/0067537 A1 | 4/2003 | Myers |
| 2003/0085866 A1 | 5/2003 | Bimber |
| 2003/0156756 A1 * | 8/2003 | Gokturk et al. ............... 382/190 |
| 2003/0218761 A1 | 11/2003 | Tomasi et al. |
| 2004/0046747 A1 | 3/2004 | Bustamante |
| 2004/0108990 A1 | 6/2004 | Lieberman et al. |
| 2004/0113885 A1 | 6/2004 | Genc et al. |
| 2004/0125207 A1 | 7/2004 | Mittal et al. |
| 2004/0183775 A1 | 9/2004 | Bell |
| 2004/0193413 A1 | 9/2004 | Wilson et al. |
| 2004/0239761 A1 | 12/2004 | Jin et al. |
| 2005/0002074 A1 | 1/2005 | McPheters et al. |
| 2005/0012817 A1 | 1/2005 | Hampapur et al. |
| 2005/0052714 A1 | 3/2005 | Klug et al. |
| 2005/0068537 A1 | 3/2005 | Han et al. |
| 2005/2252714 | 3/2005 | Klug et al. |
| 2005/0088714 A1 | 4/2005 | Kremen |
| 2005/0110964 A1 | 5/2005 | Bell et al. |
| 2005/0151850 A1 | 7/2005 | Ahn et al. |
| 2005/0166163 A1 | 7/2005 | Chang et al. |
| 2005/0275628 A1 | 12/2005 | Balakrishnan et al. |
| 2005/0285945 A1 | 12/2005 | Usui et al. |
| 2005/0286101 A1 | 12/2005 | Garner et al. |
| 2006/0010400 A1 | 1/2006 | Dehlin et al. |
| 2006/0036944 A1 | 2/2006 | Wilson |
| 2006/0052953 A1 | 3/2006 | Vilanova et al. |
| 2006/0092178 A1 | 5/2006 | Tanguay |
| 2006/0125799 A1 | 6/2006 | Hillis et al. |
| 2006/0187196 A1 | 8/2006 | Underkoffler et al. |
| 2006/0203363 A1 | 9/2006 | Levy-Rosenthal |
| 2006/0209021 A1 | 9/2006 | Yoo et al. |
| 2007/0024590 A1 | 2/2007 | Krepec |
| 2007/0064092 A1 | 3/2007 | Sandbeg et al. |
| 2008/0013826 A1 | 1/2008 | Hillis et al. |
| 2008/0028325 A1 | 1/2008 | Ferren et al. |
| 2008/0043106 A1 | 2/2008 | Hassapis et al. |
| 2008/0150913 A1 | 6/2008 | Bell et al. |
| 2008/0244468 A1 | 10/2008 | Nishihara et al. |
| 2009/0015791 A1 | 1/2009 | Chang et al. |
| 2009/0103780 A1 * | 4/2009 | Nishihara et al. ............. 382/103 |
| 2009/0115721 A1 | 5/2009 | Aull et al. |
| 2009/0116742 A1 | 5/2009 | Nishihara |
| 2009/0316952 A1 | 12/2009 | Ferren et al. |
| 2010/0050133 A1 | 2/2010 | Nishihara et al. |

FOREIGN PATENT DOCUMENTS

| | | |
|---|---|---|
| EP | 0 571 702 A2 | 12/1993 |
| EP | 0 571 702 A3 | 12/1993 |
| EP | 0 913 790 A1 | 5/1999 |
| EP | 1 223 537 A2 | 12/2001 |
| EP | 1 689 172 A1 | 8/2006 |
| EP | 2056185 * | 2/2007 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/02187 A1 | 1/2000 |
| WO | WO 00/21023 A1 | 4/2000 |
| WO | WO 00/55802 A | 9/2000 |
| WO | WO 03/026299 A1 | 3/2003 |
| WO | WO 2008/001202 A3 | 1/2008 |

OTHER PUBLICATIONS

Bretzner, et al.: "Hand Gesture Recognition Using Multi-Scale Colour Features, Hierarchical Models and Particle Filtering"; Automatic Face and Gesture Recognition, 2002, Proceedings. Fifth IEEE International Conference on, IEEE, Piscataway, NJ, USA, May 20, 2002, pp. 423-428, XP010949393, ISBN: 978-0-7695-1602-8, p. 2.

British Search Report for corresponding GB0910067.8, completed Oct. 15, 2009.

DE Office Action for corresponding DE 10 2009 043 798.3, issued Nov. 10, 2010.

Dubois, et al.: "In Vivo Measurement of Surgical Gestures"; IEEE Transactions on Biochemical Engineering, vol. 49, No. 1, Jan. 2002, pp. 49-54.

EP Search Report for corresponding EP 07 25 2716, completed Jun. 4, 2010, The Hague.

EP Search Report for corresponding EP 07 25 2870 completed Aug. 16, 2010 by Suphi Umut Naci of the Hague.

European Search Report for corresponding EP 07 25 2717 completed Sep. 27, 2007 by Martin Müller of the EPO.

Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col. ¶4; p. 87, left-hand col. ¶4-right-hand col.

German Office Action for corresponding DE 10 2009 034 413.6-53, issued Sep. 29, 2010.

Hartley, et al.: "Multiple View Geometry in Computer Vision, Structure Computation"; Jul. 31, 2000, Multiple View Geometry in Computer Vision, Cambridge University Press, GB, pp. 295-311, XP002521742, ISBN: 9780521623049, pp. 295-311, figures 11.1, 11.2 & 11.7.

Ishibuci, et al.: "Real Time Hand Gesture Recognition Using 3D Prediction Model"; Proceedings of the International Conference on Systems, Man and Cybernetics. Le Touquet, Oct. 17-20, 1993; New York, IEEE, US LNKD-DOI: 10.1109/ICSMC. 1993. 390870, vol. -, Oct. 17, 1993, pp. 324-328, XP010132504, ISBN: 978-0-7803-0911-1, pp. 325; figures 1-4.

Kjeldsen, et al.: "Toward the Use of Gesture in Traditional User Interfaces"; Automatic Face and Gesture Recognition, 1996, Proceedings of the Second International Conference on Killington, VT, USA 14-16 19961014' Los Alamitos, CA, USA, IEEE Comput. Soc., ISBN 978-0-8186-7713-7; whole document.

Korida, K et al: "An Interactive 3D Interface for a Virtual Ceramic Art Work Environment"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.

Leibe, et al.: "Toward Spontaneous Interaction with the Perceptive Workbench"; IEEE Computer Graphics and Applications; p. 54-65XP-000969594; Nov./Dec. 2000.

Mitchell: "Virtual Mouse"; IP.COM Inc, West Henrietta, NY, US, May 1, 1992 ISSN 1533-0001; whole document.

Office Action for corresponding DE 10 2009 025 236.3, issued May 2010.

Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.

Pavlovic, et al.: "Visual Interpretation of Hand Gestures for Human-Computer Interaction: A Review"; Jul. 1, 1997, IEEE Transactions on Pattern Analysis and Machine Intelligence, IEEE Service Center, Los Alamitos, CA, US LNKD-DOI: 10.1109/34.598226, pp. 677-695, XP000698168, ISSN: 0162-8828, pp. 14-16, figure 5.

Plesniak, W et al.: "Spatial Interaction with Haptic Holograms"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.

Rehg: "Visual Analysis of High DOF Articulated Objects with Application to Hand Tracking"; [online] 1995, XP002585209, School of Computer Science Carnegie Mellon University, Retrieved from the internet: URL: http//www.dtoc/,o;/cgi-bin/GetTRDoc?AD=ADA306677&Location=U2&doc=GetRDoc.pdf> [retrieved on May 25, 2010], p. 1, 28, 31.

Sato, Y et al.: "Real-Time Input of 3D Pose and Gestures of a User's Hand and Its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.

Search Report for corresponding British application No. GB0917797.3; completed Jan. 28, 2010 by Mr. Jeremy Cowen.

Search Report for corresponding GB 0715481.8, Date of Search: Nov. 27, 2007.

Search Report for corresponding GB 0913330.7; Completed Nov. 3, 2009 by Dr. Russell Maurice.

Sonka, et al.: "Image Processing, Analysis, and Machine Vision Second Edition"; Sep. 30, 1998, Thomson, XP002585208, ISBN: 053495393X, p. v-xii, p. 82-89.

Sutcliffe, et al.: "Presence, Memory and Interaction in Virtual Environments"; International Journal of Human-Computer Studies, 62 (2005), pp. 307-327.

British Search Report for corresponding GB 0909597.7 completed Sep. 17, 2009.

\* cited by examiner

GESTURE RECOGNITION INTERFACE SYSTEM WITH VERTICAL DISPLAY

RELATED APPLICATIONS

This application is a continuation-in-part of U.S. patent application Ser. No. 11/485,788, filed Jul. 13, 2006. The subject matter of the aforementioned application is incorporated herein by reference in its entirety.

TECHNICAL FIELD

The present invention relates generally to interface systems, and specifically to a gesture recognition interface system with vertical display

BACKGROUND

As the range of activities accomplished with a computer increases, new and innovative ways to provide an interface with a computer are often developed to complement the changes in computer functionality and packaging. For example, touch sensitive screens can allow a user to provide inputs to a computer without a mouse and/or a keyboard, such that desk area is not needed to operate the computer. Examples of touch sensitive screens include pressure sensitive membranes, beam break techniques with circumferential light sources and sensors, and acoustic ranging techniques. However, these types of computer interfaces can only provide information to the computer regarding the touch event, itself, and thus can be limited in application. In addition, such types of interfaces can be limited in the number of touch events that can be handled over a given amount of time, and can be prone to interpret unintended contacts, such as from a shirt cuff or palm, as touch events. Furthermore, touch sensitive screens can be prohibitively expensive and impractical for very large display sizes, such as those used for presentations.

SUMMARY

One embodiment of the invention includes a gesture recognition interface system. The system may comprise a substantially vertical surface configured to define a gesture recognition environment based on physical space in a foreground of the substantially vertical surface. The system may also comprise at least one light source positioned to provide illumination of the gesture recognition environment. The system also comprises at least two cameras configured to generate a plurality of image sets based on the illumination being reflected from an input object in the gesture recognition environment. The system further comprises a controller configured to determine a given input gesture based on changes in relative locations of the input object in each of the plurality of image sets. The controller may further be configured to initiate a device input associated with the given input gesture.

Another embodiment of the invention includes a method of providing device inputs. The method comprises displaying visual content on a substantially vertical display surface, illuminating a gesture recognition environment that is defined by a physical space in a foreground of the substantially vertical display surface, and providing simulated inputs in the gesture recognition environment via gestures associated with an input object. The method also includes generating a first plurality of images and a second plurality of images associated with the input object substantially concurrently based on reflected light from the input object. The method also includes detecting features associated with the input object in each of corresponding pairs of the first and second plurality of images. The method also includes determining a plurality of three-dimensional physical locations of the input object based on a relative separation of the correlated points in the sequence of points of each of the corresponding pairs of the first and second plurality of images and determining if changes in the plurality of three-dimensional physical locations of the input object correspond to any of a plurality of pre-defined gestures. The method further comprises providing at least one device input based on a given one of the plurality of pre-defined gestures upon determining that the changes in the plurality of three-dimensional physical locations of the input object correspond to the given one of the plurality of pre-defined gestures.

Another embodiment of the invention includes a gesture recognition system. The system includes means for providing a brightness contrast between reflected light and non-reflected light in a gesture recognition environment that is defined by a physical space in front of a substantially vertical display surface. The reflected light can be reflected from an input object. The system also includes means for generating a first plurality of images of the input object based on the brightness contrast and means for generating a second plurality of images of the input object based on the brightness contrast. The first plurality of images and the second plurality of images can form a plurality of matched pairs of images of the input object. The system also includes means for generating a sequence of points associated with elongated portions of the input object in each of the first and second plurality of images and for correlating at least one pair of corresponding points in each of the plurality of matched pairs of images of the input object. The system also includes means for determining three-dimensional physical location information associated with features of the input object based on a relative separation of the correlated at least one pair of corresponding points in the plurality of matched pairs of images of the input object. The system further includes means for translating changes in the three-dimensional location information associated with the features of the input object to a given input gesture and means for providing device inputs based on matching the given input gesture with one of a plurality of pre-defined gestures.

DETAILED DESCRIPTION

The present invention relates generally to interface systems, and specifically to a gesture recognition interface system with vertical display. A user employs an input object to provide simulated inputs to a computer or other electronic device. It is to be understood that the simulated inputs are provided by gestures using the input object. For example, the user could provide gestures that include motion and/or contact with a vertical display surface using the input object. The input object could be, for example, the user's hand; a wand, stylus, pointing stick; or a variety of other devices with which the user can gesture. The simulated inputs could be, for example, simulated mouse inputs. One or more infrared (IR) light sources illuminate a gesture recognition environment that is defined by the area of physical space in front of the vertical display surface. A set of stereo cameras can each generate a plurality of images of the input object. The plurality of images can be, for example, based on a reflected light contrast of the IR light reflected back from the input object relative to substantially non-reflected light. The plurality of images of the input object from each camera could be, for example, a plurality of matched sets of images of the input object, such that each image in the matched set of images corresponds to the input object from a different perspective at substantially the same time. A given matched set of images can be employed to determine a location of the input object and the plurality of matched sets of images can be employed to determine physical motion of the input object.

A controller can be configured to receive the plurality of images to determine three-dimensional location information associated with the input object. For example, the controller could apply an algorithm to determine features of the input object, such as endpoints, length, and pitch of elongated portions of the input object in three-dimensional space. The controller could then translate the simulated inputs into device inputs based on the three-dimensional location information. For example, the controller could interpret gesture inputs based on motion associated with the input object and translate the gesture inputs into inputs to a computer or other device. The controller could also compare the motion associated with the one or more endpoints of the input object with a plurality of pre-defined gestures stored in a memory, such that a match with a given pre-defined gesture could correspond with a particular device input.

Figure 1:
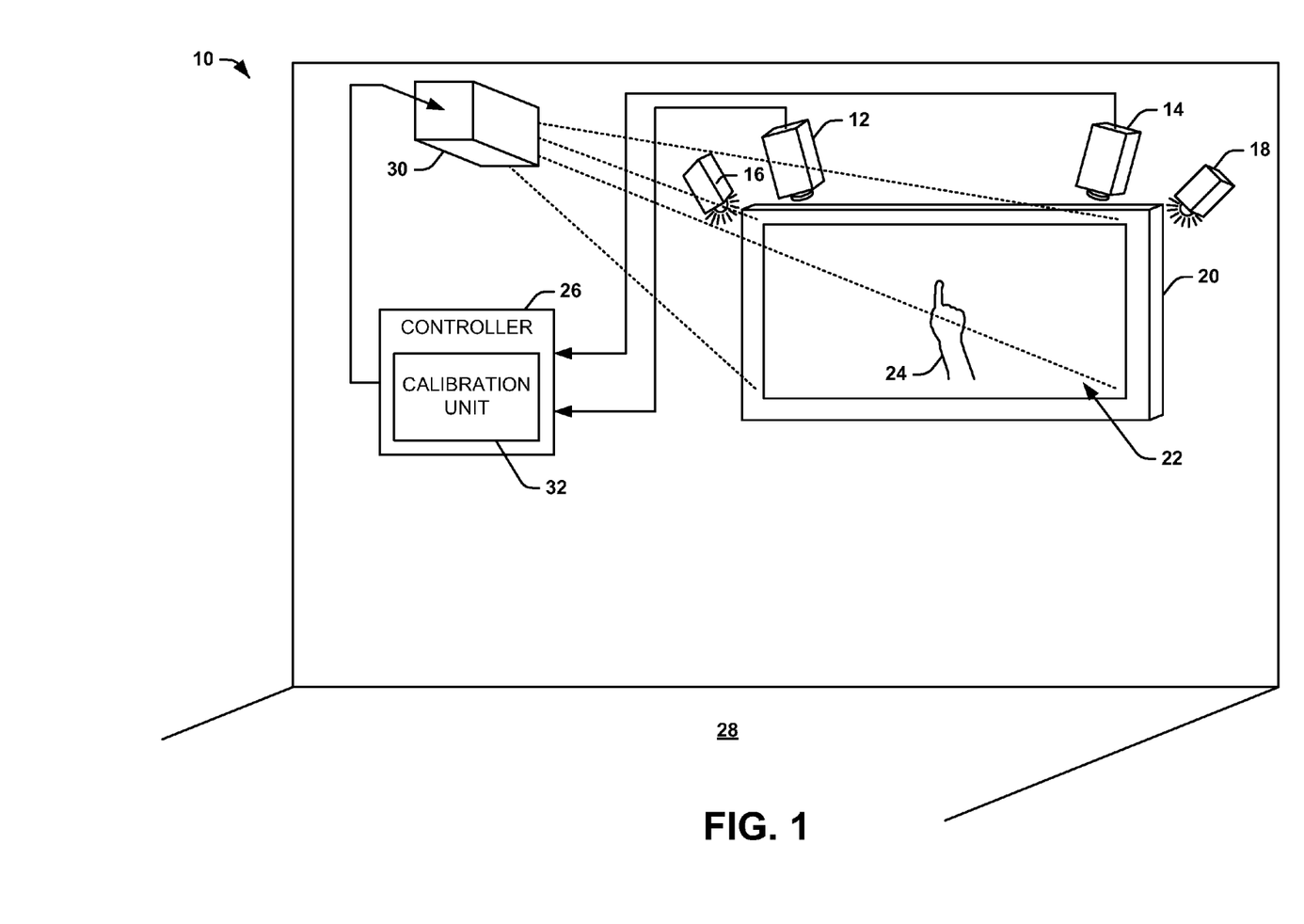
FIG. 1 illustrates an example of a gesture recognition interface system in accordance with an aspect of the invention.

FIG. 1 illustrates an example of a gesture recognition interface system 10 in accordance with an aspect of the invention. The gesture recognition interface system 10 includes a first camera 12, a second camera 14, a first IR light source 16, and a second IR light source 18 mounted above a vertical display surface 20. As an example, the vertical display surface 20 can be a projection screen. The first camera 12 and the second camera 14 may each include an IR filter, such that the respective camera may only be able to receive IR light. The first IR light source 16 and the second IR light source 18 each illuminate a gesture recognition environment 22 that is defined as the three-dimensional physical space in the foreground of the vertical display surface 20 that is visible by the first and second cameras 12 and 14.

An input object 24 can provide simulated inputs over the vertical display surface 20. In the example of FIG. 1, the input object 24 is demonstrated as a user's hand, such that the simulated inputs can be provided through hand gestures. It is to be understood that the use of a hand to provide simulated inputs via hand gestures is but one example implementation of the gesture recognition interface system 10. Examples of other types of input objects could include a stylus, wand, pointing stick, or any of a variety of devices that could provide gestures to simulate inputs. It is to be further understood that the input object 24 need not be specially designed or suited for use in the gesture recognition interface system 10. For example, a user's naked hand could be used as the input object 24, and thus a user need not wear a glove that includes retroreflective material or one or more position sensors to provide gesture inputs to the gesture recognition interface system 10 in accordance with an aspect of the invention.

In the example of FIG. 1, the first camera 12 and the second camera 14 each receive separate images of the input object 24, where each of the separate images received, respectively, by the first camera 12 and the second camera 14 are a matched set (i.e., matched pair). As an example, each of the first camera 12 and the second camera 14 could rapidly take still photograph images at, for example, sixty times per second, such that each still photograph image taken by the first camera 12 is matched to a still photograph image taken by the second camera 14 at substantially the same time. The input object 24 can appear to be in a different location in each image of the matched set captured by each of the first camera 12 and the second camera 14, respectively, due to parallax caused by the different mounted locations of each of the first camera 12 and the second camera 14. In the example of FIG. 1, the first and second cameras 12 and 14 can each be positioned as angled toward the center of the vertical display surface 20, such as to provide for more accurate position determination of the input object 24.

The images received by each of the first and second cameras 12 and 14 can be based on IR light that is reflected from the input object relative to substantially non-reflected light in the gesture recognition environment 22. Specifically, an object is illuminated at a relative brightness intensity that is $1/D^2$, where D is the distance from the light source. Thus, an object that is twice as far away as another appears four times dimmer. Accordingly, although some of the IR light emitted from the first and second IR light sources 16 and 18 may be reflected from the floor 28 beneath the vertical display surface 20, the intensity of the reflected light may be significantly less than that reflected from the input object 24.

The first camera 12 and the second camera 14 can each provide their respective separate images of the input object 24 to a controller 26. The controller 26 could reside, for example, within a computer (not shown) for which the gesture recognition interface system 10 is designed to provide a gesture recognition interface. It is to be understood, however, that the hosting of a controller is not limited to a standalone computer, but could be included in embedded processors. The controller 26 can process the respective images associated with the input object 24 to generate three-dimensional location data associated with the input object 24.

For example, each of the first camera 12 and the second camera 14 could each be mounted at pre-determined angles relative to the floor 28 beneath the vertical display surface 20. For a given matched pair of images of the input object 24, if the pre-determined angles of each of the cameras 12 and 14 are equal, then each point of the input object 24 in two-dimensional space in a given image from the camera 12 is equidistant from a corresponding point of the input object 24 in the respective matched image from the camera 14. As such, the controller 26 could determine the three-dimensional physical location of the input object 24 based on a relative parallax separation of the matched set of images of the input object 24 at a given time. In addition, using a computer algorithm, the controller 26 could also determine the three-dimensional physical location of features associated with portions of the input object 24, such as fingers and fingertips.

The gesture recognition interface system 10 can also include a projector 30. The projector 30 can provide visual content with which the user can interact and provide inputs. In the example of FIG. 1, the projector 30 can project the visual content onto the vertical display surface 20. Because the IR light sources 16 and 18 do not illuminate visible light, the IR illumination may not interfere with the visual content projected from the projector 30. The user can thus employ the input object 24 in the gesture recognition environment 22 to simulate inputs in an interactive manner with the visual content. It is to be understood that, as described herein, interaction with the visual content via gestures is defined as providing the simulated inputs through gestures in response to the visual content or to generate the visual content, as described in greater detail in the example of FIG. 7 below.

As an example, the simulated inputs can be mouse inputs, such that the controller 26 could interpret two-dimensional motion of an end-point of the input object 24 across the vertical display surface 20 as a mouse cursor and a touch of the vertical display surface 20 by the end-point of the input object 24 as a left mouse-click. Accordingly, a user of the gesture recognition interface system 10 could navigate through a number of computer menus associated with a computer merely by moving his or her fingertip through the air above the vertical display surface 20 and by touching icons projected onto the vertical display surface 20. As another example, the vertical display surface 20 can act as a virtual canvas, such that the visual content is projected as virtual ink that is provided on the virtual canvas in response to touching the vertical display surface 20 with the input object 24. In addition, additional gestures can be implemented to erase the virtual ink or change its properties, such as color or pen-width. Accordingly, the gesture recognition interface system 10 can act as a virtual "dry-erase board" on which users can draw or write.

The controller 26 includes a calibration unit 32 for calibrating the gesture recognition interface system 10. The calibration unit 32 could be a separate system working in conjunction with the controller 26, or could merely be a software routine residing within the controller 26. As an example, the calibration unit 32 can implement a calibration routine, such as interacting with software of the controller 26, at power-up or setup of the gesture recognition interface system 10, or at periodic intervals. A calibration routine can be merely a prompt for a user to touch a specific point on the vertical display surface 20 with an endpoint of the input object 24. The specific point can be one or more points having predetermined coordinates, as identified by the controller 26 and/or the calibration unit 32, on the vertical display surface 20. As an example, the specific point can be a permanent visual mark on the vertical display surface 20 or can be projected onto the vertical display surface 20 by the projector 30. As a result, the calibration unit 32 can associate the images of the input object 24 touching the specific point with the predetermined coordinates of the specific point, thus calibrating the images to allow accurate gesture interpretation.

It is to be understood that the gesture recognition interface system 10 in the example of FIG. 1 is intended to represent but one example of a gesture recognition interface system. For example, the gesture recognition interface system 10 could include more than two cameras, in multiple locations above and/or below the vertical display surface 20 that each supply respective images of the input object 24 to the controller 26.

As an example, a three-way stereo (i.e., trinocular) camera system can be employed, or multiple cameras can be implemented to increase visual coverage for a wide vertical display surface 20 or in situations where head-room above the vertical display surface 20 is insufficient. In addition, as another example, the projector 30 could project the visual content from behind the vertical display surface 20, or the vertical display surface 20 could be a liquid crystal display (LCD) or plasma monitor instead of a projection screen. As a further example, the IR light sources 16 and 18 may not illuminate in the IR spectrum, but could instead illuminate in a different spectrum, such as narrow frequency bands of visible light, with each of the respective cameras 12 and 14 having a corresponding spectrum filter. Accordingly, the gesture recognition interface system 10 can be configured in any of a variety of ways.

Figure 2:
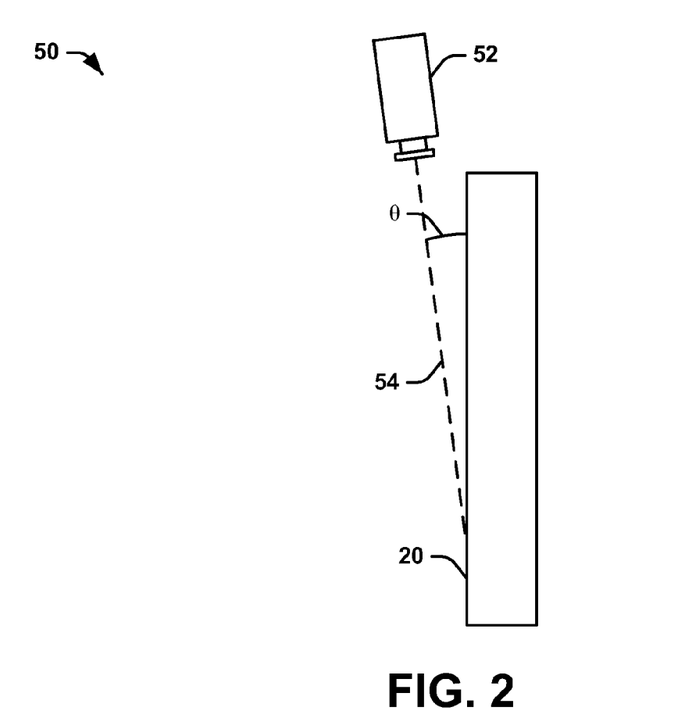
FIG. 2 illustrates an example of a camera system for a gesture recognition interface system in accordance with an aspect of the invention.

FIG. 2 illustrates an example of a camera system 50 for a gesture recognition interface system in accordance with an aspect of the invention. The camera system 50 can be implemented in the gesture recognition interface system 10 in the example of FIG. 1. Therefore, reference is to be made to the gesture recognition interface system 10 in the example of FIG. 1 in the following discussion of the example of FIG. 2.

In the example of FIG. 2, the camera system 50 is demonstrated in a side-view with respect to the vertical display surface 20. Thus, the camera system 50 demonstrates positioning of a camera 52, which can be representative of one of the cameras 12 and 14 in the example of FIG. 1. Specifically, as demonstrated in the example of FIG. 2, the camera 52 is positioned above the vertical display surface 20 such that a central lens axis 54 of the camera 52 has a glancing angle of θ with respect to a plane that is defined by the vertical display surface 20. As described herein, the central lens axis 54 is defined as an axis projecting from the center of the lens of the camera 52. As an example, the glancing angle θ can be a substantially small, non-zero angle. As another example, the glancing angle θ can be zero, such that the camera 52 can be positioned closer to the vertical display surface 20.

As a result of the positioning of the cameras 12 and 14 relative to the vertical display surface 20, as demonstrated by the camera 52 in the example of FIG. 2, both the vertical display surface 20 and the gesture recognition environment 22 in front of the vertical display surface 20 can be imaged by the cameras 12 and 14. Specifically, the position of the camera 52 in the example of FIG. 2 demonstrates that the cameras 12 and 14 are configured to image the vertical display screen 20 and a volume of physical space in a foreground of the vertical display surface 20 (e.g., approximately 10 to 20 inches of foreground) that is sufficient to capture input gestures with the input object 24 without necessarily requiring a touch of the vertical display screen 20. Therefore, based on the positioning of the camera 52, the controller 26 can calculate the three-dimensional position of the input object 24 from an analysis of the image positions and parallax between the cameras 12 and 14. Furthermore, the arrangement of the cameras 12 and 14 can allow for a higher precision measurement of the distance between the vertical display surface 20 and the input object 24 than is possible with the central lens axis 54 being substantially normal to the vertical display surface 20.

Figure 3:
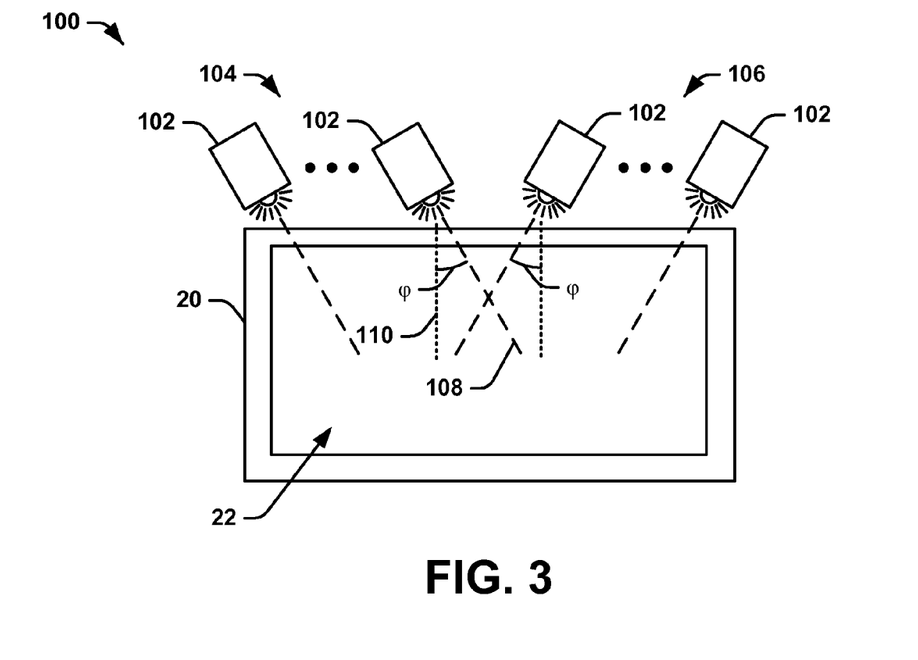
FIG. 3 illustrates an example of an illumination system for a gesture recognition interface system in accordance with an aspect of the invention.

FIG. 3 illustrates an example of an illumination system 100 for a gesture recognition interface system in accordance with an aspect of the invention. The illumination system 100 can be implemented in the gesture recognition interface system 10 in the example of FIG. 1. Therefore, reference is to be made to the gesture recognition interface system 10 in the example of FIG. 1 in the following discussion of the example of FIG. 3.

The illumination system 100 includes a plurality of illuminators 102 that are positioned above the vertical display surface 20. As an example, the illuminators 102 can be IR illuminators. The illuminators 102 are divided into a first portion 104 and a second portion 106. Each of the first and second portions 104 and 106 can include one or more of the illuminators 102. As such, the illuminators 102 can be distributed across the top of the vertical display surface 20 to illuminate the gesture recognition environment 22 in a substantially uniform manner. In addition, the illuminators 102 can be positioned as having a large incidence angle (e.g., approximately 90°) with respect to a plane that is defined by the vertical display surface 20.

The illuminators 102 in the first and second portions 104 and 106 are each positioned with an angled central illumination axis 108. As described herein, the central illumination axis 108 is defined as an axis projecting from the center of the IR light source of the illuminator 102. Specifically, the illuminators 102 in the first portion 104 are positioned at an angle $\phi$ with respect to a normal axis 110 of the floor 28 (not shown in the example of FIG. 2) toward the center of the vertical display surface 20. Likewise, the illuminators 102 in the second portion 106 are positioned at an angle $\phi$ with respect to the normal axis 110 of the floor 28 toward the center of the vertical display surface 20, such that the first portion 104 and the second portion 106 of the illuminators 102 are mirror images.

Because of the angled positioning of the illuminators 102 with respect to the normal axis 110, direct illumination of the floor 28 beneath the vertical display surface 20 is mitigated. Specifically, the illuminators 102 illuminate the floor 28 at an angle of incidence of $\phi$. As a result, significantly less illumination is reflected from the floor 28 and into the gesture recognition environment 22. Therefore, the brightness contrast between the light reflected from the input object 24 and the non-reflected light in the physical space of the gesture recognition environment is greater. Accordingly, edges of the input object 24 can be more distinctly identified in the images that are provided from the first and second cameras 12 and 14, such that features associated with the input object 24 can be detected more accurately by an algorithm that is implemented by the controller 26.

In addition, because the illuminators 102 are positioned as having a large angle of incidence with respect to the plane of the vertical display surface 20, the vertical display surface 20 can appear substantially dimmer to the cameras 12 and 14 relative to the input object 24 with respect to the reflected IR light. Furthermore, the vertical display surface 20 in the illumination system 100, and thus the gesture recognition interface system 10, can be configured as retroreflective. As such, light that is incident on the vertical display surface 20 is substantially reflected back to the illumination source. However, retroreflectivity may be substantially diminished at larger incidence angles. As a result of the retroreflectivity of the vertical display surface 20, IR light that is emitted from the illuminators 102, or that is reflected from the input object 24 onto the vertical display surface 20, is thus not reflected to the cameras 12 and 14. Accordingly, although the vertical display surface 20 is imaged by the cameras 12 and 14, as described above in the example of FIG. 2, the vertical display surface 20 can remain substantially dimmer to the cameras 12 and 14 relative to the input object 24 with respect to the reflected IR light.

Figure 4:
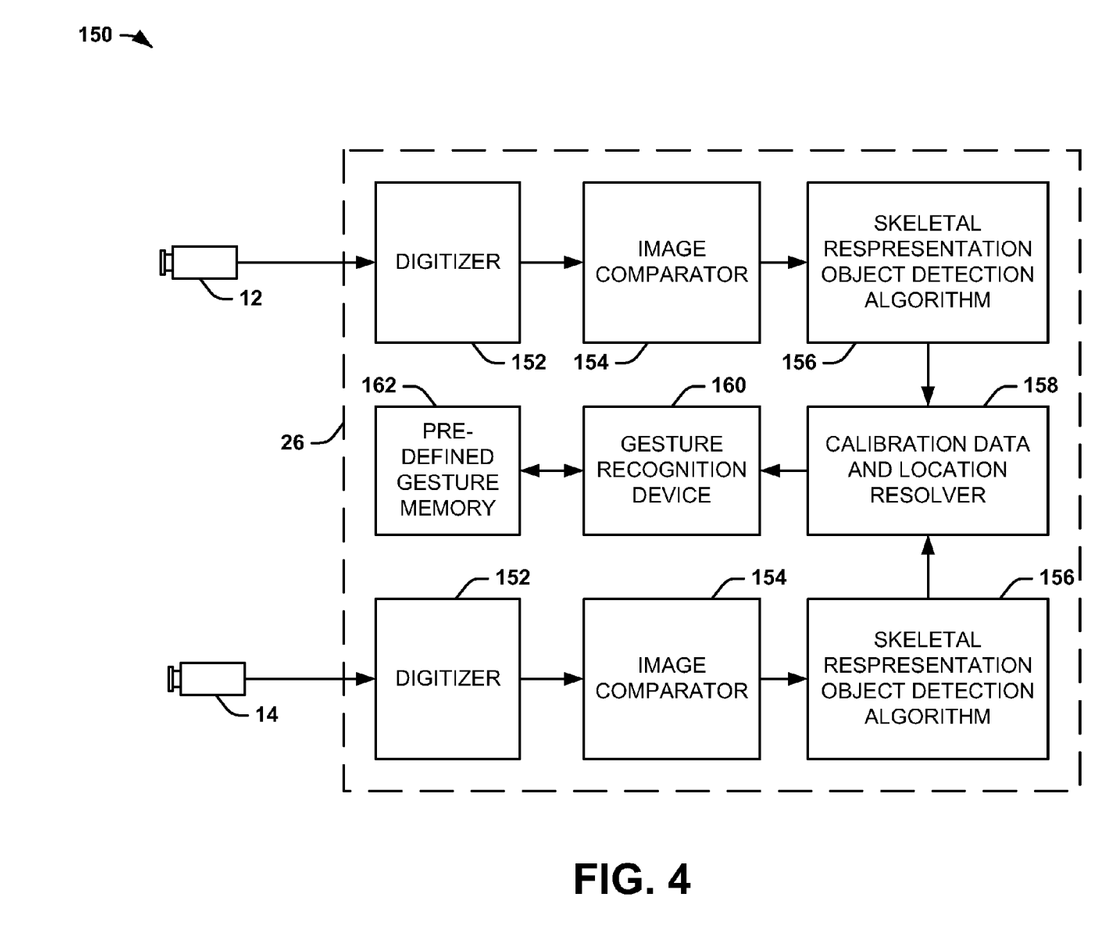
FIG. 4 illustrates another example of a gesture recognition interface system in accordance with an aspect of the invention.

FIG. 4 illustrates another example of a gesture recognition interface system 150 in accordance with an aspect of the invention. The gesture recognition interface system 150 can be substantially similar to the gesture recognition interface system 10 in the example of FIG. 1. As such, reference is to be made to the example of FIG. 1 in the following discussion of the example of FIG. 4.

The gesture recognition interface system 150 includes the controller 26, the first camera 12, and the second camera 14. The first and second cameras 12 and 14 each receive a plurality of images of the input object 24, such as a user's hand. The respective images of the input object 24 could be images based on a brightness contrast between light reflected from the input object 24 and non-reflected light in the gesture recognition environment 22.

The first and second cameras 12 and 14 each input their respective images of a matched pair of images into a digitizer 152. The digitizer 152 produces digitized versions of the images of the input object. The digitized images of the input object 24 are input to an image comparator 154. The image comparator 154 compares each of the digitized images of the input object to a previously stored digitized image of the input object to generate a binarized image of the input object 24. Such a comparison allows for an improved quality of the digitized images when the IR illumination of the gesture recognition environment 22 is not uniform across the vertical display surface 20. The previously stored digitized image could have been captured during a calibration operation and/or from repeatedly storing the digitized image in memory buffers.

As an example, a background model can be maintained for each of the cameras 12 and 14 without the input object 24 being present. The background model images can be used to decide at each pixel whether the images of the input object 24 correspond to a binary 1 or 0. For example, at each pixel location, if the image of the input object 24 has a value that is approximately greater than the corresponding background model image times a threshold scaling value of between 0 and 1, the output value will be a binary 1, thus denoting the presence of the input object 24. In this manner, the scaling value can be selected to provide an optimal balance between desirably detecting the input object 24 while being substantially insensitive to residual reflected illumination back to the first and second cameras 12 and 14. As a result, edges associated with the input object 24 can be detected in each of the images.

The contrast enhanced binarized images of the input object 24 are then each input to a skeletal representation object detection algorithm device 156. The object detection algorithm device 156 can be an integrated circuit (IC) or set of ICs within the controller 26, or could be a software routine residing in the controller 26. The object detection algorithm device 156 can be configured to detect features associated with the input object 24 in each of the binarized images. As an example, the object detection algorithm device 156 can detect length, inclination, and/or endpoints associated with elongated portions of the input object 24.

As an example, the object detection algorithm device 156 can be configured to determine a location of a sequence of mid-points associated with edges of the elongated portions of the input object 24. The mid-points can be symmetric points that are approximately midway between two boundary points at edges of the input object 24 in the image where there are no other boundary points present in a two-dimensional coordinate system. A linking algorithm can thus connect the symmetric points into chains, from which straight segments that correspond to the elongated portions can be parsed. The symmetric points can be annotated with a radial distance parameter which describes a ball centered on that point which fits within the boundaries of the image. The chains and segment structures can thus inherit the radial distance parameter to form the skeletal representation of the input object 24, from which the features of the elongated portions can be derived.

Figure 5:
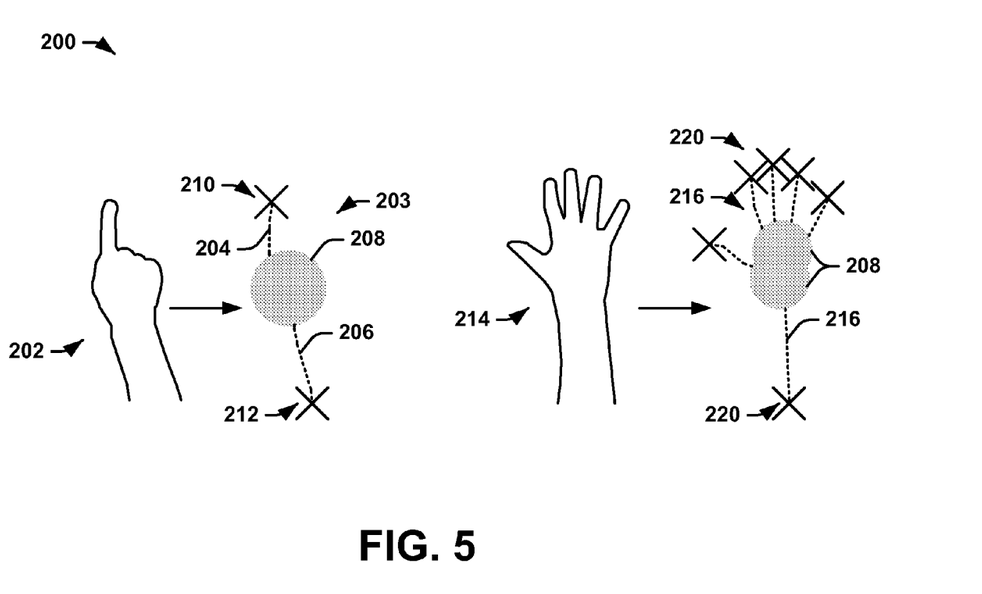
FIG. 5 illustrates an example of a diagram of hand image conversions based on an algorithm for use in a gesture recognition interface system in accordance with an aspect of the invention.

FIG. 5 illustrates an example of a diagram 200 of hand image conversions based on the skeletal representation object detection algorithm in accordance with an aspect of the invention. A first hand image 202 is demonstrated as having an extended index finger from a substantially closed fist. The object detection algorithm device 156 can thus convert the first hand image 202 into a skeletal representation 203. Specifically, the object detection algorithm device 156 can determine the sequence of mid-points along the elongated portions (i.e., arm and index finger), demonstrated in the example of FIG. 5 as dotted lines 204 and 206 corresponding to symmetric axes of the index finger and the arm, respectively. The dotted lines 204 and 206 are separated by a ball 208 that corresponds to the fist. As a result, the object detection algorithm device 156 can ascertain endpoints of the symmetric axes of the arm and the index finger, demonstrated respectively by the "X" 210 and the "X" 212, in two-dimensional space in each of the images.

A second hand image 214 is demonstrated as having all fingers and the thumb extended. The object detection algorithm device 156 can thus convert the second hand image 214 into a skeletal representation 215. Specifically, the object detection algorithm device 156 can determine the sequence of mid-points along the elongated portions (i.e., arm, thumb, and all fingers), demonstrated in the example of FIG. 5 as dotted lines 216 corresponding to symmetric axes of each of the arm, thumb, and fingers. The dotted lines 216 extend from overlapping balls 218 that correspond to the palm. As a result, the object detection algorithm device 156 can ascertain endpoints of the symmetric axes of the arm, thumbs, and fingers, demonstrated by an "X" 220 at the end of each, in two-dimensional space in each of the images.

Referring back to the example of FIG. 4, the skeletal representation images of the input object 24 are provided to a calibration data and location resolver 158. The calibration data and location resolver 158 determines a three-dimensional location of the input object 24, as well as all associated features, at a given time. As an example, the calibration data and location resolver 158 can be configured to compare the relative two-dimensional locations of the corresponding points in each of the skeletal representation images of the input object 24 and to interpolate a three-dimensional location of the points based on a parallax separation of the corresponding points.

Figure 6:
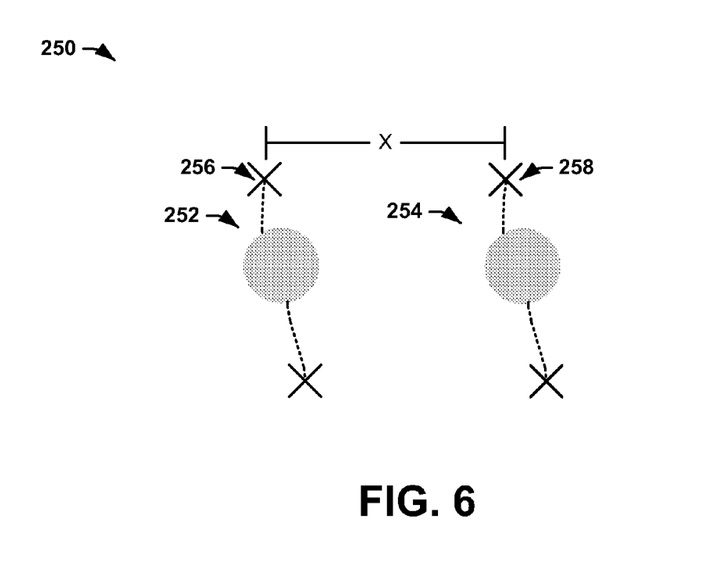
FIG. 6 illustrates an example of a diagram of parallax separation of converted hand images for use in a gesture recognition interface system in accordance with an aspect of the invention.

FIG. 6 illustrates an example of a diagram 250 of parallax separation of converted hand images in accordance with an aspect of the invention. The diagram 250 includes a first converted image 252 and a second converted image 254 of the input object 24, demonstrated in the example of FIG. 6 as a user's hand. The converted images 252 and 254 are thus demonstrated as skeletal representations of the input object 24, such as described above in the example of FIG. 5. The first converted image 252 could have been received by the first camera 12 and the second converted image 254 could have been received by the second camera 14. The calibration data and location resolver 158 can thus receive both of the converted images 252 and 254 concurrently as a composite image superimposed together. Due to parallax caused by the separate locations of the cameras 12 and 14, an end-point 256 of the first converted image 252 and an end-point 258 of the second converted image 254 are demonstrated in the example of FIG. 6 as spaced apart from each other by a distance X. The distance X is thus demonstrative of a stereo disparity of the input object 24, such that the distance X represents a difference in position of the end-points 256 and 258 in the respective converted images 252 and 254.

Differing values of the stereo disparity X can denote changes in height associated with the user's fingertip, as represented by the end-points 256 and 258. For example, as X increases, the user's fingertip is moved vertically higher (e.g., closer to the cameras 12 and 14), and as X decreases, the user's fingertip is moved vertically lower (e.g., further from the cameras 12 and 14). Therefore, the calibration data and location resolver 68 interpolates the three-dimensional location of the endpoints of the input object based on parallax separation. The controller 26 can be calibrated to know which values of X correspond to the height of the user's fingertip relative to the point on the vertical display surface 20 having a predetermined location.

As an example, the corresponding points that are measured by the calibration data and location resolver 158 could be one or more of the end-points, such as the end-points 210, 212, and 220 in the example of FIG. 5. As another example, the corresponding points that are measured by the calibration data and location resolver 158 could be any of the mid-points along the elongated portions, such as mid-points 204, 206, and 216 in the example of FIG. 5. The gesture recognition interface system 150 can be calibrated to identify the amount of physical separation of the two-dimensional images that corresponds to a height, as well as lateral and proximal locations, of the features of the input object 24 relative to the vertical display surface 20. Accordingly, the calibration data and location resolver 158 can detect a two-dimensional position of the input object 24 with respect to the vertical display surface 20, as well as a touch of an endpoint of the input object 24 (e.g., the user's fingertip) to the vertical display surface 20.

The data output from the calibration data and location resolver 158 is input to a gesture recognition device 160. The gesture recognition device 160 interprets the three-dimensional location data associated with the one or more endpoints of the input object and translates changes in the location data into an input gesture. Because the gesture recognition device 160 implements the location data associated with the input object, it can be programmed to recognize any of a variety of gestures that utilize one or more fingertips of the user's hand. In this way, the gesture recognition interface system 150 has a much more versatile input capability than touch sensitive screens.

For example, gestures that use multiple fingertips, or even fingertips from both hands, can be interpreted as input gestures that simulate zoom commands, rotate or "twist" commands, or even environment adjustments, such as volume and brightness control, all of which can be programmed for interpretation by the gesture recognition device 160. The gesture recognition device 160 can also be programmed to recognize gestures from multiple users simultaneously. For example, the gesture recognition device 160 can provide multi-point control capability, such that coordinated actions between two hands and/or between multiple users can be implemented. Furthermore, the gesture recognition device 160 can work in conjunction with other computer input devices, such as a conventional mouse or keyboard, to provide additional types of gesture inputs. In addition, the simulated commands may not even require touching the vertical display surface. For example, the gesture recognition device 160 can evaluate not only changes in the three-dimensional location of the input object 24, but also a time threshold associated with its motion. Moreover, any of a variety of input gestures could be formed from six-degree of freedom motion based on changes in three-dimensional location and orientation of the input object 24 and any associated endpoints.

The controller 52 could also include a pre-defined gesture memory 162 coupled to the gesture recognition device 160. The pre-defined gesture memory 162 could include a plurality of pre-defined gestures, with each of the pre-defined gestures corresponding to a particular device input. For example, the pre-defined gesture memory 162 could include a database of specific arrangements and combinations of fingertip positions and motions that each correspond to a different computer input. The gesture recognition device 160, upon receiving the three-dimensional location data associated with the one or more endpoints of the input object over a given time, could poll the pre-defined gesture memory 162 to determine if the gesture input matches a pre-defined gesture. Upon determining a match, the gesture recognition device 160 could translate the gesture input into the device input that corresponds to the pre-defined gesture. The pre-defined gesture memory 162 could be pre-programmed with the appropriate pre-defined gesture inputs, or it could be dynamically programmable, such that new gestures can be added, along with the corresponding device inputs. For example, a user could activate a "begin gesture sample" operation, perform the new gesture, capture the appropriate images of the new gesture using the first camera 12 and the second camera 14, and input the appropriate device input for which the new gesture corresponds.

It is to be understood that a given gesture recognition interface system is not intended to be limited by the example of FIGS. 2-6. Other implementations are possible for providing inputs in accordance with an aspect of the invention. For example, one or more of the devices in the controller 26 could be integral with other devices, or could be separate from the controller 26. For example, the cameras 12 and 14 could each input their respective images to a common digitizer 152. As another example, similar to as described above regarding the example of FIG. 1, a given gesture recognition interface system is not intended to be limited to two cameras, but can include multiple cameras above and/or below the vertical display surface 20. Furthermore, the controller 26 is not limited to implementing the skeletal representation object detection algorithm to determine features associated with the input object. For example, other algorithms can be employed, such as a two-dimensional Laplacian of Gaussian convolution filtering operation to determine endpoints associated with the input object 24, such as fingertips. Accordingly, the gesture recognition interface system 150 can be configured in any of a variety of ways.

Figure 7:
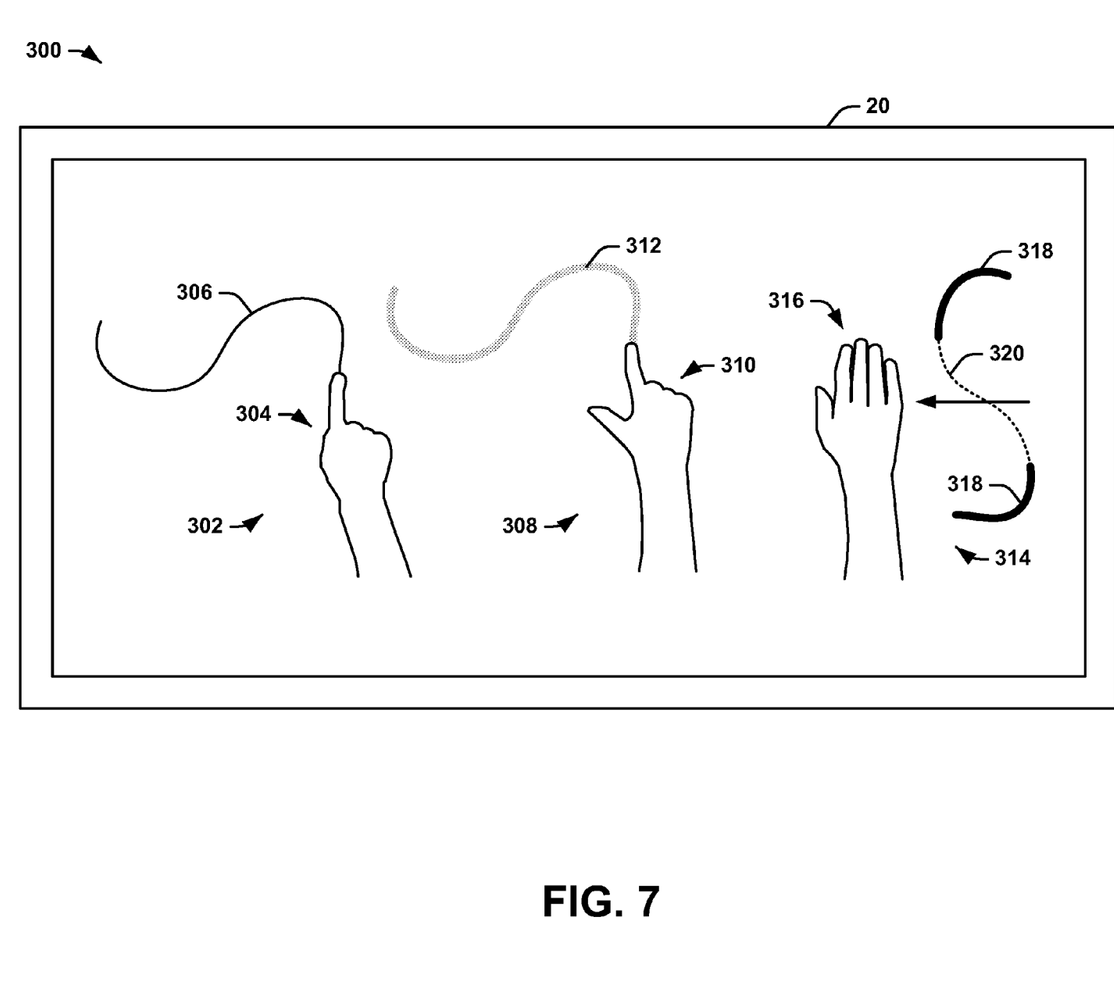
FIG. 7 illustrates an example of a gesture application in accordance with an aspect of the invention.

FIG. 7 illustrates an example of a gesture application 300 in accordance with an aspect of the invention. The gesture application 300 can be implemented on the gesture recognition interface system 10 described in the example of FIG. 1 above. As such, reference is to be made to the example of FIG. 1 in the following description of the example of FIG. 7.

The gesture application 300 is demonstrated as a virtual dry-erase board on the vertical display surface 20, similar to as described above in the example of FIG. 1. The gesture application 300 demonstrates a first gesture 302 that is formed by touching the vertical display surface 20 with an extended index finger from an otherwise closed fist, as demonstrated by the hand 304. The controller 26 can be configured (e.g., via the gesture recognition device 160) to recognize the first gesture 302 and to respond by providing the visual data, such as from the projector 30, as virtual ink 306 on the vertical display surface 20. As a result, the user can draw and/or write on the vertical display surface 20 with the virtual ink 306 by doing nothing more than touching and moving his or her finger across the vertical display surface 20, as demonstrated by the first gesture 302.

The gesture application 300 also demonstrates a second gesture 308, which is a composite gesture that is a variation of the first gesture 302. Specifically, the second gesture 308 is formed by touching the vertical display surface 20 with an extended index finger and an extended thumb from an otherwise closed fist, as demonstrated by the hand 310. Thus, the second gesture 308 is a composite gesture because it combines the first gesture 302 with an additional gesture (i.e., the extension of the thumb). The controller 26 can thus be configured to recognize the second gesture 308 as a combination of the first gesture 302 and a gesture that includes the extension of the thumb, such that the extended thumb provides a modification to the first gesture 302. In the example of the FIG. 7, the controller 26 responds to the second gesture 308 by providing the visual data as virtual ink 312, which is a variation of the virtual ink 306. Specifically, the virtual ink 312 is demonstrated as having a thicker pen-width and a different color relative to the virtual ink 306.

The second gesture 308 thus demonstrates that any of a variety of variations can be provided from the first gesture 302, and is not limited to merely adding the extension of the thumb. As an example, different pen-widths and/or colors can be implemented based on different combinations of extended fingers and/or the thumb of the hand 310. As another example, the visual data that is provided on the vertical display surface 20 can include a virtual color palette and/or a pen-width selector, such as in a corner of the vertical display surface 20. For example, the visual content can display just a currently selected color and/or pen-width, or can display all available colors and/or pen-widths with an arrow or outline that demonstrates the currently selected color and/or pen-width. Thus, the user can provide an additional gesture to toggle between or to select from the available color and/or pen-width. For example, the user can make a trigger gesture with the thumb to toggle between the selection options, or can implement gestures from the other hand that may or may not involve touching the screen while still performing write and/or draw gestures with the hand 310. As a result, any of a variety of composite gestures can be implemented in the example of FIG. 7.

The gesture application 300 also demonstrates a third gesture 314 that is formed by touching the vertical display surface 20 with an open palm, as demonstrated by the hand 316. The controller 26 can be configured to recognize the third gesture 314 and to respond by erasing virtual ink. In the example of FIG. 7, the third gesture 314 is demonstrated as the hand 316 moving through virtual ink 318, and erasing a portion of it that is covered by the hand 316, as demonstrated by the dotted lines 320. In addition, the third gesture 314 can likewise include composite gestures for an erasure of virtual ink. As an example, the controller 26 can be configured to respond to a gesture that includes the user placing both open palms on the vertical display surface 20 as an "erase all" command, such that all of the virtual ink is erased from the vertical display surface 20. As another example, portions of the virtual ink can be selected based on one command, such that a simple touch with a finger or open palm can correspond to erasure of the selected virtual ink.

It is to be understood that the gesture application 300 is not limited to the virtual dry-erase board application that is described in the example of FIG. 7. As an example, the controller 26 can be configured to recognize a large plurality of pre-programmed gestures, such that different gestures can manipulate drawn and/or written virtual ink in a variety of different ways. For example, the gesture application 300 can be configured substantially similar to any of a variety of commercially available computer drafting programs.

It is also to be understood that the virtual dry-erase board functionality can be extended to function as and/or can be combined with any of a variety of computer slide-show presentation software programs. As an example, some slide-show presentation software programs support drawing annotation on slides using a mouse. Therefore, as described herein, a slide-show presentation can be controlled using gestures for moving forward and backward through slides and for drawing on slides using natural finger drawing gestures, such as described in the example of FIG. 7. For example, one or more additional hand gestures can be employed to switch to a blank slide on which the virtual ink can be drawn and/or written to allow a more expansive presentation before, after, or during a presentation that includes pre-prepared slides. Accordingly, any of a variety of gesture applications can be implemented.

Figure 8:
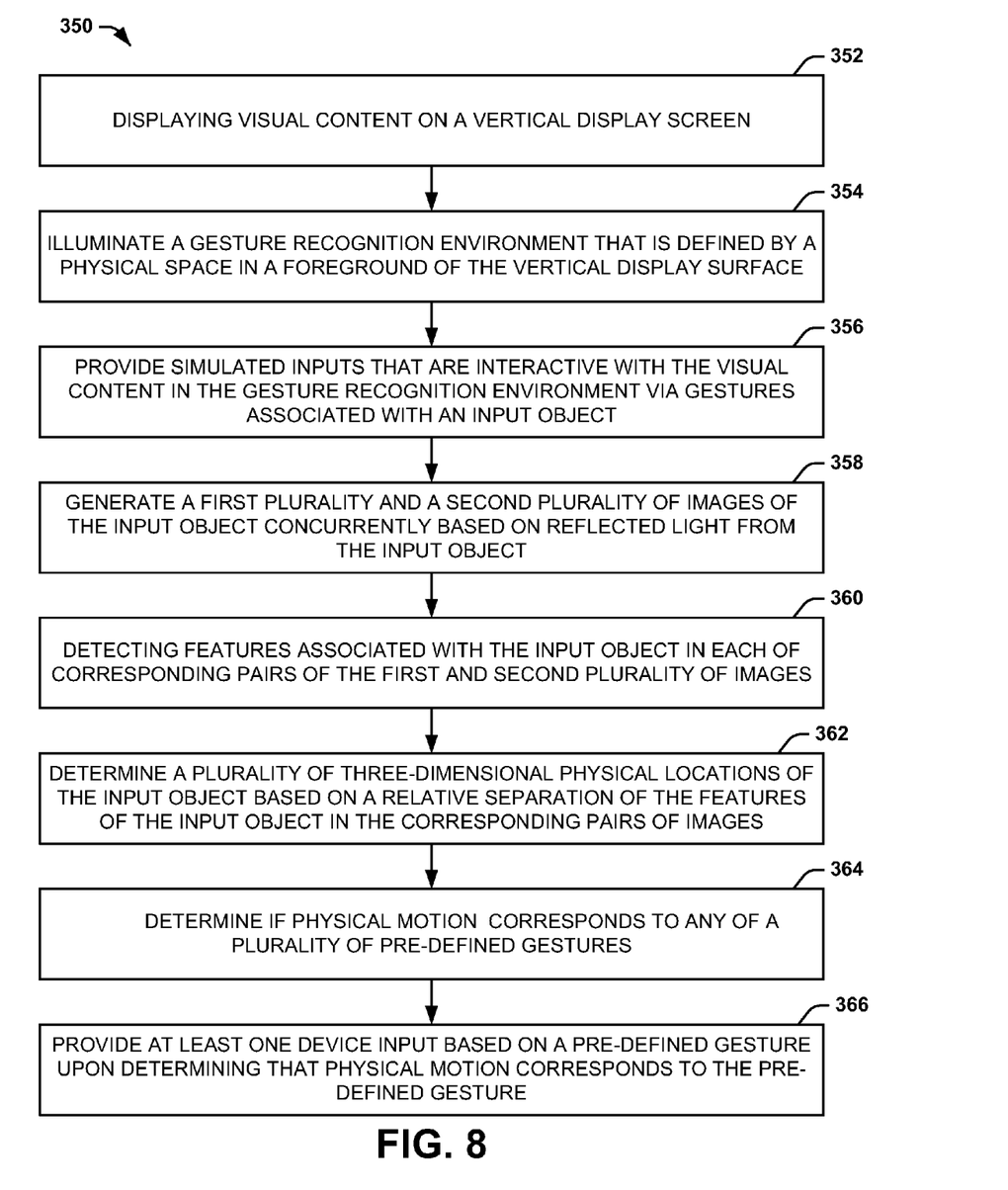
FIG. 8 illustrates an example of a method for providing inputs to a computer in accordance with an aspect of the invention.

In view of the foregoing structural and functional features described above, a methodology in accordance with various aspects of the present invention will be better appreciated with reference to FIG. 8. While, for purposes of simplicity of explanation, the methodologies of FIG. 8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 8 illustrates an example of a method 350 for providing inputs in accordance with an aspect of the invention. At 352, visual content is displayed on a vertical display surface. The vertical display surface could be a display screen on which visual content can be projected. At 354, a gesture recognition environment that is defined by a physical space in a foreground of a substantially vertical display surface is illuminated. The illumination could be provided by IR light sources. At 356, a user provides simulated inputs that are interactive with the visual content in the gesture recognition environment via gestures associated with an input object. The input object could be the user's hand, such that the user simulates the inputs via hand gestures. In addition, the simulated inputs could be simulated mouse inputs, zoom commands, or rotate commands. The simulated inputs could also be touches to the vertical display surface, such that the simulated inputs provide virtual ink with which to draw and/or write on the vertical display surface. As such, the gesture recognition system can be substantially configured as a virtual dry-erase board.

At 358, a first plurality and a second plurality of images of the input object are generated concurrently based on reflected light from the input object. The plurality of images could be a plurality of matched sets of images, such that each image of the matched set corresponds to the input object from a different perspective at substantially the same time. The images can be generated based on reflected light from the input object relative to non-reflected light in the gesture recognition environment. Therefore, the plurality of images could be images of the user controlled input object.

At 360, features associated with the input object are detected in each of corresponding sets of the first and second plurality of images. The features can be detected by generating a sequence of points along elongated portions of the input object in each of the first and second plurality of images. For example, the sequence of points can be mid-points that are symmetrically located between boundary points that define edges of the input object in the first and second images. Each point in the sequence of points of the first plurality of images can be correlated with each corresponding point in the sequence of points in the second plurality of images. The correlation of the points in each of the first and second images can be based on mutual end-points or any of the points along the elongated portions of the input object. At 362, a plurality of three-dimensional physical locations of the input object are determined based on a relative separation of the correlated points in the sequence of points of each of the sets of the first and second plurality of images. The relative separation can be based on a parallax separation between the first and second images. The three-dimensional location could be determined relative to the vertical display surface. Changes in location of the three-dimensional location of at least one end-point of the input object could be determinative of the physical motion of the input object. At 364, it is determined whether the physical motion associated with the input object corresponds to any of a plurality of pre-defined gestures. The pre-defined gestures could be stored in a memory. Each pre-defined gesture could be associated with a different device input. At 366, at least one device input is provided based on determining that the physical motion associated with the input object corresponds to a given one of the pre-defined gestures. Device inputs could be mouse inputs, such that two-dimensional motion across the vertical display surface could simulate motion of a mouse cursor, and a touch of the vertical display surface could simulate a mouse left-click. In addition, motion associated with multiple endpoints could provide different types of inputs, such as rotate and zoom commands.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A gesture recognition interface system comprising:
a substantially vertical surface in which three-dimensional physical space in a foreground of the substantially vertical surface defines a gesture recognition environment;
at least one light source positioned to provide illumination of the gesture recognition environment between the at least one light source and the substantially vertical surface;
at least two cameras configured to generate a plurality of image sets based on the illumination that is provided from the at least one light source being reflected from an input object positioned in the gesture recognition environment; and
a controller configured to implement an algorithm that detects features associated with the input object in each of the plurality of image sets based on determining a sequence of mid-points between opposing edges of elongated portions of the input object in a predetermined coordinate system in each of the plurality of image sets and based on correlating the sequence of mid-points of each of a first image with corresponding mid-points of a second image in each of the plurality of image sets to calculate endpoints, length, and pitch of the elongated portions of the input object and to determine a given input gesture performed in the gesture recognition environment based on changes in relative locations of the input object in each of the plurality of image sets, and being further configured to initiate a device input associated with the given input gesture.

2. The interface system of claim 1, wherein the at least two cameras are positioned such that a central lens axis of each of the at least two cameras is substantially parallel with respect to a plane that is defined by the substantially vertical surface to capture the substantially vertical surface and the gesture recognition environment in the plurality of image sets.

3. The interface system of claim 1, wherein the at least one light source is positioned such that a central illumination axis of the at least one light source has a non-zero angle of incidence with respect to a normal associated with a floor under the substantially vertical surface.

4. The interface system of claim 1, wherein the substantially vertical surface is configured to display visual content that is interactive with the input object.

5. The interface system of claim 4, wherein the controller is configured to provide the visual content as virtual ink on portions of the substantially vertical surface that are contacted by the input object.

6. The interface system of claim 5, wherein at least one of a color change, a pen-width change, and erasure of the virtual ink is controlled via a respective at least one additional predetermined gesture.

7. The interface system of claim 1, wherein the at least one light source comprises at least one infrared (IR) light source, and wherein the at least two cameras each comprise an IR filter.

8. The interface system of claim 7, wherein the controller comprises an automated calibration unit configured to calibrate the gesture recognition interface system based on an amount of parallax separation between matched sets of images of the input object that is placed in contact with at least one predetermined two-dimensional location on the substantially vertical surface.

9. The interface system of claim 1, wherein the substantially vertical surface is configured as a substantially vertical retroreflective surface to substantially mitigate the receipt of illumination reflected from the input object to the substantially vertical surface by at least one of the at least two cameras.

10. A method of providing device inputs, the method comprising:
displaying visual content on a substantially vertical display surface;
illuminating a gesture recognition environment that is defined by a three-dimensional physical space in a foreground of the substantially vertical display surface via at least one light source;
providing simulated inputs that are interactive with the visual content in the gesture recognition environment via gestures associated with an input object;
generating a first plurality of images and a second plurality of images associated with the input object substantially concurrently based on reflected light from the input object that is provided from the at least one light source;
detecting features associated with the input object in each of corresponding pairs of the first and second plurality of images based on determining edges of the input object in each of the first and second plurality of images based on the reflected light and based on generating a sequence of mid-points between opposing edges along the elongated portions of the input object in a predetermined coordinate system in each of the first and second plurality of images;
determining a plurality of three-dimensional physical locations of the input object based on a relative separation of the features associated with the input object in the corresponding pairs of the first and second plurality of images;
determining if changes in the plurality of three-dimensional physical locations of the input object correspond to any of a plurality of pre-defined gestures; and
providing at least one device input based on a given one of the plurality of pre-defined gestures upon determining that the changes in the plurality of three-dimensional physical locations of the input object correspond to the given one of the plurality of pre-defined gestures.

11. The method of claim 10, further comprising:
contacting at least one predetermined point in two-dimensional space on the substantially vertical display surface with an endpoint of the input object;
generating a first and second calibration image of the input object in contact with the at least one predetermined point; and
calibrating the three-dimensional physical locations of the input object based on an amount of parallax separation between the endpoint of the input object in each of the first and second calibration image.

12. A gesture recognition interface system comprising:
means for providing a brightness contrast between reflected light and non-reflected light in a gesture recognition environment that is defined by a three-dimensional physical space in front of a substantially vertical display surface, the reflected light being reflected from an input object in the gesture recognition environment;
means for generating a first plurality of images of the input object based on the brightness contrast;
means for generating a second plurality of images of the input object based on the brightness contrast, the first plurality of images and the second plurality of images forming a plurality of matched pairs of images of the input object;
means for generating a sequence of points associated with elongated portions of the input object in each of the first and second plurality of images and for correlating at least one pair of corresponding points in each of the plurality of matched pairs of images of the input object to calculate endpoints, length, and pitch of the elongated portions of the input object;
means for determining three-dimensional physical location information associated with features of the input object based on a relative separation of the correlated at least one pair of corresponding points in the plurality of matched pairs of images of the input object;
means for translating changes in the three-dimensional location information associated with the features of the input object to a given input gesture; and
means for providing device inputs based on matching the given input gesture with one of a plurality of pre-defined gestures.

13. The interface system of claim 12, wherein the means for generating the sequence of points is configured to determine edges of the input object in each of the first and second plurality of images based on the brightness contrast and to generate a sequence of mid-points between opposing edges of elongated portions of the input object in a predetermined coordinate system in each of the first and second plurality of images.

14. The interface system of claim 12, wherein the means for generating the first plurality of images and the means for generating the second plurality of images are configured to obtain the first and second plurality of images at a glancing angle that is substantially parallel with respect to a plane that is defined by the substantially vertical display surface to capture the substantially vertical display surface and the gesture recognition environment in each of the first and second plurality of images.

15. The interface system of claim 12, further comprising means for calibrating the means for determining three-dimensional location information associated with the input object based on an amount of parallax separation of a matched pair of images of an endpoint of the input object in contact with at least one predetermined two-dimensional physical location on the substantially vertical display surface.

* * * * *